(12) United States Patent
Song et al.

(10) Patent No.: US 10,418,633 B2
(45) Date of Patent: Sep. 17, 2019

(54) ELECTRODE FOR LITHIUM SECONDARY BATTERY, METHOD FOR PREPARING SAME, ELECTRODE ASSEMBLY FOR LITHIUM SECONDARY BATTERY COMPRISING SAME, AND LITHIUM SECONDARY BATTERY COMPRISING SAME

(71) Applicant: LG CHEM, LTD., Seoul (KR)

(72) Inventors: Charles Kiseok Song, Daejeon (KR); Byoung Hyo Jung, Daejeon (KR); Seong Eun Park, Daejeon (KR); Doo Kyung Yang, Daejeon (KR); Ki Young Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/543,387

(22) PCT Filed: Jun. 22, 2016

(86) PCT No.: PCT/KR2016/006591
§ 371 (c)(1),
(2) Date: Jul. 13, 2017

(87) PCT Pub. No.: WO2016/208949
PCT Pub. Date: Dec. 29, 2016

(65) Prior Publication Data
US 2018/0006307 A1    Jan. 4, 2018

(30) Foreign Application Priority Data

Jun. 22, 2015 (KR) ........................ 10-2015-0088190

(51) Int. Cl.
*H01M 8/04* (2016.01)
*H01M 4/62* (2006.01)
(Continued)

(52) U.S. Cl.
CPC ........... *H01M 4/622* (2013.01); *C08K 5/0025* (2013.01); *C08K 5/541* (2013.01); *C08K 5/544* (2013.01);
(Continued)

(58) Field of Classification Search
CPC ...................................... H01M 4/02
See application file for complete search history.

(56) References Cited

U.S. PATENT DOCUMENTS

| 3,720,699 A | 3/1973 | Stoddard |
| 2002/0055042 A1 | 5/2002 | Kweon et al. |

(Continued)

FOREIGN PATENT DOCUMENTS

| CN | 102786546 A | 11/2012 |
| CN | 104577094 A | 4/2015 |

(Continued)

OTHER PUBLICATIONS

European Search Report for Appl. No. 16814662.9 dated Jun. 11, 2018.
(Continued)

*Primary Examiner* — Jacob B Marks
(74) *Attorney, Agent, or Firm* — Birch, Stewart, Kolasch & Birch, LLP (57) ABSTRACT

The present invention relates to an electrode for a lithium secondary battery, a method for preparing the same, an electrode assembly for a lithium secondary battery comprising the same, and a lithium secondary battery comprising the same, wherein the electrode comprises an electrode active material, an aqueous binder, a compound represented by Formula 1, and a compound represented by Formula 2. Formula 1 and Formula 2 are the same as set forth in the specification. The electrode for a lithium secondary battery improves the physical properties of the aqueous binder in a (Continued)

manner whereby a cross-linking reaction material is combined with the aqueous binder, so that the electrode can improve initial charge/discharge efficiency and the life span of a lithium secondary battery, preferably a lithium sulfur battery, and improve the area capacity of the electrode.

16 Claims, 3 Drawing Sheets

(51) Int. Cl.

| | | |
|---|---|---|
| H01M 4/13 | (2010.01) | |
| H01M 4/38 | (2006.01) | |
| H01M 10/052 | (2010.01) | |
| C08K 5/00 | (2006.01) | |
| C08K 5/541 | (2006.01) | |
| C08K 5/544 | (2006.01) | |
| H01M 4/88 | (2006.01) | |
| H01M 10/39 | (2006.01) | |
| H01M 4/139 | (2010.01) | |
| C01B 17/00 | (2006.01) | |
| H01M 12/06 | (2006.01) | |

(52) U.S. Cl.
CPC ............ *H01M 4/13* (2013.01); *H01M 4/139* (2013.01); *H01M 4/38* (2013.01); *H01M 4/621* (2013.01); *H01M 4/8825* (2013.01); *H01M 10/052* (2013.01); *C01B 17/00* (2013.01); *H01M 12/06* (2013.01)

(56) References Cited

U.S. PATENT DOCUMENTS

| | | | |
|---|---|---|---|
| 2002/0102466 A1 | 8/2002 | Hwang et al. | |
| 2003/0073000 A1 | 4/2003 | Lee et al. | |
| 2004/0058246 A1 | 3/2004 | Choi et al. | |
| 2009/0305139 A1 | 12/2009 | Oh et al. | |
| 2010/0047693 A1 | 2/2010 | Yang et al. | |
| 2011/0081578 A1* | 4/2011 | Chang .................. | H01M 4/366 429/223 |
| 2011/0098397 A1 | 4/2011 | Plehiers et al. | |
| 2012/0034516 A1 | 2/2012 | Koo et al. | |
| 2013/0224592 A1 | 8/2013 | Iwasaki | |
| 2014/0038048 A1 | 2/2014 | Chung et al. | |
| 2014/0162140 A1 | 6/2014 | Hoshiba et al. | |
| 2015/0080630 A1* | 3/2015 | Dunagan ................ | H01M 10/54 588/318 |
| 2016/0230026 A1 | 8/2016 | Furusawa | |
| 2016/0329555 A1 | 11/2016 | Lee et al. | |

FOREIGN PATENT DOCUMENTS

| | | |
|---|---|---|
| CN | 104600271 A | 5/2015 |
| CN | 105111231 A | 12/2015 |
| JP | 11-176425 A | 7/1999 |
| JP | 2002-75447 A | 3/2002 |
| JP | 2010-503174 A | 1/2010 |
| JP | 2013-191327 A | 9/2013 |
| JP | 2013-231154 A | 11/2013 |
| JP | 2014-116164 A | 6/2014 |
| JP | 2015-36445 A | 2/2015 |
| KR | 10-2001-0091887 A | 10/2001 |
| KR | 10-2003-0032364 A | 4/2003 |
| KR | 10-2004-0026207 A | 3/2004 |
| KR | 10-2008-0021270 A | 3/2008 |
| KR | 10-0898705 B1 | 5/2009 |
| KR | 10-1056714 B1 | 8/2011 |
| KR | 10-2012-0006667 A | 1/2012 |
| KR | 10-1113045 B1 | 2/2012 |
| KR | 10-2012-0034686 A | 4/2012 |
| KR | 10-1159098 B1 | 6/2012 |
| KR | 10-1304868 B1 | 9/2013 |
| KR | 10-2014-0018124 A | 2/2014 |
| KR | 10-1481234 B1 | 1/2015 |
| KR | 10-2015-0061874 A | 6/2015 |
| KR | 10-2015-0078059 A | 7/2015 |
| WO | 2012/066600 A1 | 5/2012 |

OTHER PUBLICATIONS

International Search Report for PCT/KR2016/006591 (PCT/ISA/210) dated Sep. 22, 2016.

* cited by examiner

ELECTRODE FOR LITHIUM SECONDARY BATTERY, METHOD FOR PREPARING SAME, ELECTRODE ASSEMBLY FOR LITHIUM SECONDARY BATTERY COMPRISING SAME, AND LITHIUM SECONDARY BATTERY COMPRISING SAME

TECHNICAL FIELD

The present invention relates to an electrode for a lithium secondary battery which comprises a cross-linked aqueous binder, a method for preparing the same, an electrode assembly for a lithium secondary battery comprising the same, and a lithium secondary battery comprising the same.

CROSS REFERENCE TO RELATED APPLICATIONS

This application claims the benefit of Korean Patent Application No. 10-2015-0088190 on Jun. 22, 2015 and Korean Patent Application No. 10-2016-0076868 on Jun. 20, 2016 with the Korean Intellectual Property Office, the disclosure of which is herein incorporated by reference in its entirety.

BACKGROUND ART

As the recent development of high-tech electronics industry allows miniaturization and weight lightening of electronic devices, portable electronic devices are increasingly used. Batteries having a high energy density are much more required as the power supply of such portable electronic devices and thus researches for a lithium secondary battery are actively pursued. The lithium secondary battery includes a lithium ion battery, a lithium sulfur battery, a lithium-air battery, and the like.

In addition, the research for improving energy density, safety, and the like in the lithium secondary battery is continuously required. For example, the research on the innovative conversion system in the transition insertion chemistry has been done, one of which is about lithium sulfur system.

The lithium sulfur system is a system based on the reaction of $16Li+S_8 \rightarrow 8Li_2S$, which can obtain much high energy (2,500 Whkg$^{-1}$) than that of the existing lithium ion battery (500 Whkg$^{-1}$). Since the lithium sulfur battery uses high-capacity substances of sulfur and a lithium metal instead of those substances (positive electrode lithium cobalt oxide/negative electrode carbon) mainly used for the positive electrode and the negative electrode of the existing lithium ion battery and lithium ion polymer battery, it can give 3 to 5 times larger capacity than the existing lithium ion battery or lithium ion polymer battery and it can also give such advantages of a low price and being environmentally friendly. Thus, it has been noted as a next-generation secondary battery.

The lithium sulfur battery generally uses a sulfur-based material having an S—S bond (Sulfur-Sulfur linkage) as a positive electrode active material and a carbon-based material which is capable of insertion/deinsertion of an alkali metal such as lithium or a metal ion such as a lithium ion, and the like as a negative electrode active material. The lithium sulfur battery uses a redox reaction for the storage and generation of electric energy, wherein the S—S bond is broken while decreasing the oxidation number of S during the reduction reaction (when discharged) and the S—S bond is formed again while increasing the oxidation number of S during the oxidation reaction (when charged).

However, the lithium sulfur battery has such problems that it is difficult to maintain the structure of sulfur/carbon charge/discharge composite based on aqueous/non-aqueous polymers, the areal electrode loading is low (<2 mAh/cm$^2$) due to the low adhesiveness between the ground electrode and the composite, and it has insufficient ability of suppressing the elution of lithium-polysulfide.

DISCLOSURE

Technical Problem

It is an object of the present invention to provide an electrode for a lithium secondary battery, which can improve the initial coulombic efficiency and the life span of a lithium secondary battery, preferably a lithium sulfur battery, and improve the area capacity of the electrode.

It is another object of the present invention to provide a method for preparing the electrode for a lithium secondary battery.

It is still another object of the present invention to provide an electrode assembly for a lithium secondary battery comprising the electrode for a lithium secondary battery.

It is still another object of the present invention to provide a lithium secondary battery comprising the electrode assembly for a lithium secondary battery.

Technical Solution

In order to achieve the above objects, the present inventors have found that a cross-linker may be added during the manufacture of an electrode for a lithium secondary battery to improve the physical properties of an aqueous binder, thereby enhancing the life span and the initial coulombic efficiency of the lithium secondary battery, preferably a lithium sulfur battery, and enhancing the area capacity of the electrode. They completed the present invention based on this.

One embodiment of the present invention provides an electrode for a lithium secondary battery, which comprises an electrode active material, an aqueous binder, a compound represented by the following Formula 1, and a compound represented by the following Formula 2:

[Formula 1]

[Formula 2]

wherein, in Formula 1 and 2, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of H, $N(R_7)_2$, $CO_2R_7$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

One compound selected from the group consisting of the compound represented by Formula 1, the compound represented by Formula 2 and combinations thereof may be a cross-linker which crosslinks the aqueous binder.

The compound represented by Formula 1 and the compound represented by Formula 2 may be chemically combined to form a compound represented by the following Formula 3:

[Formula 3]

wherein, in Formula 3, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of H, $N(R_7)_2$, $CO_2R_7$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

In Formula 1 and Formula 2 above, all of $R_1$ to $R_3$ may be an alkoxy group having 1 to 3 carbon atoms, and $R_4$ may be one selected from the group consisting of $N(R_7)_2$, $CO_2R_7$, $R_8SH$ and $R_8Si(OR_7)_3$.

The aqueous binder may be one selected from the group consisting of carboxymethyl cellulose (CMC), alginate, carbonyl-β-cyclodextrine and nafion.

The electrode for a lithium secondary battery may comprise 0.1 to 40% by weight of the aqueous binder, 0.1 to 20% by weight of the compound represented by Formula 1 and the compound represented by Formula 2 and the remaining content of the electrode active material, based on a total weight of the electrode.

The electrode for a lithium secondary battery may be a positive electrode.

The lithium secondary battery may be a lithium sulfur battery, and the positive electrode active material may be one selected from the group consisting of elemental sulfur ($S_8$), a sulfur-based compound and mixtures thereof.

Another embodiment of the present invention provides a method for preparing an electrode for a lithium secondary battery, which comprises the steps of mixing an electrode active material, an aqueous binder, a compound represented by the following Formula 1 and a compound represented by the following Formula 2 to prepare a slurry for forming an electrode, and coating at least one side of a current collector by the slurry for forming an electrode to prepare the electrode:

[Formula 1]

[Formula 2]

wherein, in Formula 1 and 2, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of H, $N(R_7)_2$, $CO_2R_7$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

The compound represented by Formula 1 and the compound represented by Formula 2 may be chemically combined to form a compound represented by the following Formula 3:

[Formula 3]

wherein, in Formula 3, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of H, $N(R_7)_2$, $CO_2R_7$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

In the step for preparing the slurry for forming an electrode, the aqueous binder, the compound represented by Formula 1 and the compound represented by Formula 2 may be mixed together, and then mixed with the electrode active material.

Still another embodiment of the present invention provides an electrode assembly for a lithium secondary battery wherein a positive electrode and an negative electrode are alternately laminated using a separator as a boundary, and at least one among the positive electrode and the negative electrode is the electrode for a lithium secondary battery.

Still another embodiment of the present invention provides a lithium secondary battery comprising the electrode assembly.

Advantageous Effects

The electrode for a lithium secondary battery according to the present invention can enhance the initial coulombic efficiency and the life span of a lithium secondary battery, preferably a lithium sulfur battery and enhance the area capacity of the electrode by improving the physical properties of the aqueous binder through the combination of a cross-linker with the aqueous binder.

BEST MODE

The present invention may be modified in various manners and may have several examples, and thus the present inventors are to exemplify the present invention by certain examples and illustrate it in the description in detail. However, the present invention is not intended to be restricted to certain embodiments, and it should be understood to cover all the variations, equivalents and alternatives which fall under the concept and technical scope thereof.

The terms are used in the present invention for illustrating only certain examples, and are not intended to limit the present invention. The singular forms "a", "an" and "the" include the plural forms unless the context clearly dictates otherwise. The terms "comprise," "have," etc. as used herein should be understood to indicate the presence of features, figures, steps, actions, elements, components, or combinations thereof described in the present specification, but not to exclude in advance the possibility of presence or addition of one or more other features, figures, steps, actions, elements, components, or combinations thereof.

The halogen atom as used herein means any one selected from the group consisting of fluorine, chlorine, bromine and iodine unless stated otherwise.

The alkyl group as used herein includes a primary alkyl group, a secondary alkyl group and a tertiary alkyl group unless stated otherwise.

All the compounds and substituents as used herein may be substituted or unsubstituted unless stated otherwise. At this time, the term "substituted" means that hydrogen is replaced by any one selected from the group consisting of halogen atom, hydroxy group, carboxy group, cyano group, nitro group, amino group, thio group, methylthio group, alkoxy group, nitrile group, aldehyde group, epoxy group, ether group, ester group, carbonyl group, acetal group, ketone group, alkyl group, perfluoroalkyl group, cycloalkyl group, heterocycloalkyl group, allyl group, benzyl group, aryl group, heteroaryl group, derivatives thereof and combinations thereof.

The alkylene group is a secondary atomic group formed by excluding two hydrogen atoms which are connected to two different carbon atoms of a saturated aliphatic hydrocarbon, unless stated otherwise, and may be represented by the general formula —$C_nH_{2n}$—.

An electrode for a lithium secondary battery according to one embodiment of the present invention comprises an electrode active material, an aqueous binder, a compound represented by Formula 1 and a compound represented by Formula 2.

One compound selected from the group consisting of the compound represented by Formula 1, the compound represented by Formula 2 and combinations thereof may be a cross-linker which crosslinks the aqueous binder.

The electrode for a lithium secondary battery may improve the physical properties of the aqueous binder by comprising the cross-linker. According to this, the electrode for a lithium secondary battery may comprise the electrode active material, and the aqueous binder which is cross-linked by one compound selected from the group consisting of the compound represented by Formula 1, the compound represented by Formula 2 and combinations thereof. Due to the presence of the cross-linked aqueous binder, the life span of a lithium secondary battery, the low initial coulombic efficiency, and the area capacity of the electrode may be enhanced.

[Formula 1]

[Formula 2]

Wherein, in Formula 1 and 2, $R_1$ to $R_3$ may be each independently one selected from the group consisting of an alkyl group having 1 to 3 carbon atoms, an alkoxy group having 1 to 3 carbon atoms and a halogen atom. Preferably all of the $R_1$ to $R_3$ may be an alkoxy group having 1 to 3 carbon atoms. When all of the $R_1$ to $R_3$ are an alkoxy group having 1 to 3 carbon atoms, the cross-linker is capable of the self-crosslinking reaction even in the state of a single molecule while maintaining its water soluble property. When the self-crosslinking reaction is possible in the state of a single molecule, it does not affect the physical property of the slurry for forming an electrode.

$R_4$ may be one selected from the group consisting of H, $N(R_7)_2$, $CO_2R_7$, $R_8SH$, $R_8Si(OR_7)_3$ and an alkyl group having 1 to 3 carbon atoms, and preferably one selected from the group consisting of $N(R_7)_2$, $CO_2R_7$, $R_8SH$ and $R_8Si(OR_7)_3$. When said $R_4$ is one selected from the group consisting of $N(R_7)_2$, $CO_2R_7$, $R_8SH$ and $R_8Si(OR_7)_3$, it may increase the water soluble property of the cross-linker, through which said $R_1$ to $R_3$ may have other substituents than the alkoxy group while maintaining the water soluble property thereof. In addition, through the change of said $R_4$, it is possible to endow the cross-linker and the electrode with various properties.

$R_5$ to $R_7$ may be each independently hydrogen or an alkyl group having 1 to 3 carbon atoms, and $R_8$ may be an alkylene group having 1 to 3 carbon atoms.

n is an integer selected from 1 to 6. When said n exceeds 6, the water soluble property of the cross-linker may be declined to make its application to the aqueous binder difficult.

Also, the compound represented by Formula 1 and the compound represented by Formula 2 may be chemically combined to form a compound represented by the following Formula 3. In other words, the cross-linker may be the compound represented by Formula 1, the compound represented by Formula 2, a mixture thereof or the compound represented by Formula 3 which is a chemical combination thereof. When the compound represented by Formula 1 or the compound represented by Formula 2 is the cross-linker, the remaining compound may be included as an additive.

[Formula 3]

Wherein, in Formula 3, since $R_1$ to $R_3$, $R_4$, $R_5$ to $R_7$, $R_8$ and n have the same definition as mentioned for Formula 1 and 2 above, the repetitive description thereon is omitted herein.

The cross-linker may be included in the amount of 0.1 to 20% by weight, preferably 2 to 10% by weight based on a total weight of the electrode. The degree of crosslinking between the aqueous binders may not be sufficient to lower the effect when the content of cross-linker is less than 0.1% by weight based on a total weight of the electrode. And the electrode may be hardened more than necessary due to the extreme crosslinking reaction over the whole electrode which is made between the binders as well as on the aqueous binder and the overall battery performance may be deteriorated due to the decrease of concentration of conductive material and active material when the content exceeds 20% by weight.

Figure 1:
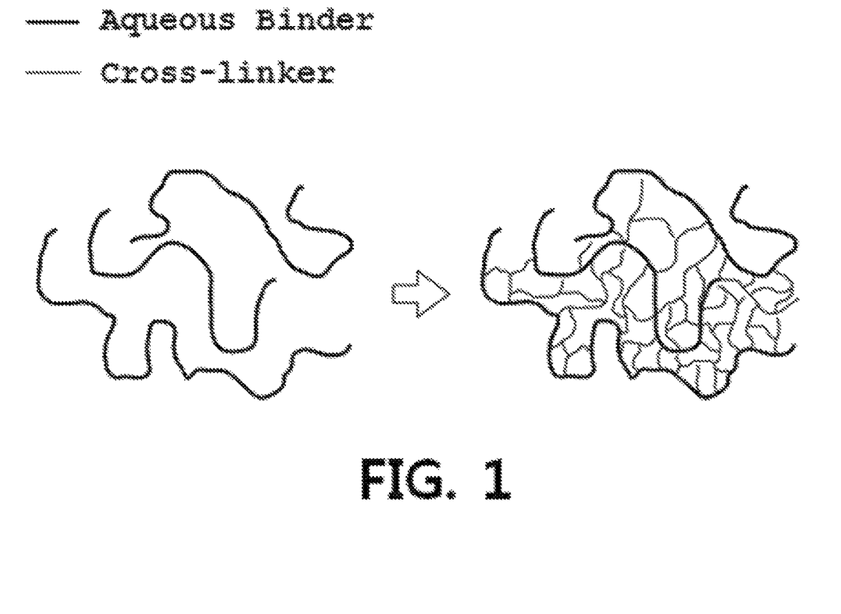
FIG. 1 is a schematic diagram showing the structure of the aqueous binder which is improved by the addition of a cross-linker.

FIG. 1 is a schematic diagram showing the structure of the aqueous binder polymer which is improved by the addition of the cross-linker. Referring to FIG. 1, the aqueous binder polymer is cross-linked by the cross-linker, thereby preventing the micro- or macro-cracking phenomenon of electrode to realize the high-loading electrode, and enhancing the molecular weight of aqueous binder to improve the post-fabrication physical property.

Hereinafter, the electrode for a lithium secondary battery which comprises the said cross-linker will be explained in detail. Preferably, the electrode for a lithium secondary battery may be a positive electrode in the lithium sulfur battery, lithium air battery, lithium selenium battery, lithium tellurium battery, or lithium polonium battery. It may be prepared by a conventional method of manufacturing a positive electrode for a lithium secondary battery except for additionally comprising the said cross-linker. In one embodiment of the present invention, the case of applying the cross-linker to the positive electrode for a lithium sulfur battery is mainly explained, but the present invention is not limited thereto. The cross-linker may be applied to general electrodes for a lithium secondary battery, and also may be applied to a negative electrode.

Specifically, as an example, the positive electrode is located in a positive electrode current collector and on the positive electrode current collector, and may comprise a layer of positive electrode active material which includes a positive electrode active material, an aqueous binder, the said cross-linker, and optionally a conductive material.

It may be desirable to use, concretely, aluminum foam, nickel foam, and the like having excellent conductivity as the positive electrode current collector.

In addition, the layer of positive electrode active material may comprise elemental sulfur ($S_8$), a sulfur-based compound, or mixtures thereof as the positive electrode active material. Specifically, the sulfur-based compound may be $Li_2S_n$ ($n \geq 1$), an organic sulfur compound, or a carbon-sulfur polymer (($C_2S_x$)n: x=2.5~50, $n \geq 2$) and the like.

The layer of positive electrode active material may comprise, along with the positive electrode active material, a conductive material for moving electrons smoothly inside the positive electrode, and a binder for enhancing the binding strength between the positive electrode active materials or between the positive electrode active material and the positive electrode current collector.

The conductive material may be a carbon-based material such as carbon black, acetylene black, and Ketjen black or a conductive polymer such as polyaniline, polythiophene, polyacetylene, and polypyrrole. It may be preferably included in the amount of 2 to 40% by weight based on a total weight of positive electrode active material layer. The conductivity enhancing effect due to the use of conductive material is trivial when the content of conductive material is less than 2% by weight, and on the contrary the content of positive electrode active material becomes relatively low to cause some concern about deterioration of capacity characteristics when the content of conductive material exceeds 40% by weight.

In addition, the binder may include poly(vinyl acetate), polyvinyl alcohol, polyethylene oxide, polyvinylpyrrolidone, alkylated polyethylene oxide, crosslinked polyethylene oxide, polyvinyl ether, poly(methylmethacrylate), polyvinylidene fluoride, copolymer of polyhexafluoropropylene and polyvinylidene fluoride (trade name: Kynar), poly(ethyl acrylate), polytetrafluoroethylene, polyvinyl chloride, polyacrylonitrile, polyvinyl pyridine, polystyrene, derivatives, blends, copolymers thereof and the like.

In the present invention, the binder may preferably be an aqueous binder. The aqueous binder may use one selected from the group consisting of carboxymethyl cellulose (CMC), alginate, carbonyl-β-cyclodextrine and nafion.

In addition, the binder may preferably be included in the amount of 0.1 to 40% by weight based on a total weight of the positive electrode active material layer. The effect of improving the binding strength between the positive electrode active materials or between the positive electrode active material and the positive electrode current collector due to the use of the binder is trivial when the content of binder is less than 0.1% by weight, and on the contrary the content of positive electrode active material becomes relatively low to cause some concern about deterioration of capacity characteristics when the content of binder exceeds 40% by weight.

The positive electrode may be prepared by a conventional method. Specifically, it may be prepared by mixing the positive electrode active material, the binder, the cross-linker and optionally the conductive material in an organic solvent to give the slurry for forming a positive electrode, applying the slurry on the positive electrode current collector, drying and optionally rolling it. At this time, the positive electrode active material, the binder and the cross-linker may be mixed at one time or the aqueous binder and the cross-linker may be mixed first, which is then mixed with the positive electrode active material.

At this time, the cross-linker may be the compound represented by Formula 1 the compound represented by Formula 2a mixture thereof or the compound represented by Formula 3 which is a chemical combination thereof.

At this time, it is preferable to use an organic solvent which may uniformly disperse the positive electrode active material, the binder, the cross-linker and the conductive material and is easily evaporated. Specifically, acetonitrile, methanol, ethanol, tetrahydrofuran, water, isopropyl alcohol and the like may be mentioned.

On the other hand, when the electrode for a lithium secondary battery is an negative electrode, the negative electrode may comprise one selected from the group consisting of a material capable of reversible intercalation and deintercalation of lithium ions, a material capable of reversibly forming a lithium-containing compound by reacting with lithium ions, lithium metal and lithium alloy, as the negative electrode active material.

As the material capable of reversible intercalation and deintercalation of lithium ions, a carbon material, i.e., any carbon-based negative electrode active material which is generally used in a lithium secondary battery may be used. Specifically, crystalline carbon, amorphous carbon or both may be used. Also, a typical example of the material capable of reversibly forming a lithium-containing compound by reacting with lithium ions may include tin oxide ($SnO_2$), titanium nitrate, silicon (Si) and the like, but not limited thereto. The lithium alloy, specifically, may be an alloy of lithium with a metal of Si, Al, Sn, Pb, Zn, Bi, In, Mg, Ga or Cd.

In addition, the negative electrode may optionally further comprise a binder and a conductive material along with the negative electrode active material. Since the binder and the conductive material are the same as those explained for said positive electrode, the repetitive description thereon is omitted herein.

Further, the negative electrode may comprise the cross-linker along with the binder.

In addition, the negative electrode may further comprise an negative electrode current collector for the purpose of supporting the negative electrode active layer containing the negative electrode active material.

Specifically, the negative electrode current collector may be one selected from the group consisting of copper, aluminum, stainless steel, titanium, silver, palladium, nickel, alloys thereof and combinations thereof. The stainless steel may be surface-treated with carbon, nickel, titanium or silver, and the alloy may be an aluminum-cadmium alloy. Besides the above, baked carbon, a non-conductive polymer of which surface is treated with a conductive material, a conductive polymer and the like may also be used.

Still another embodiment of the present invention provides an electrode assembly comprising said electrode.

Specifically, the electrode assembly has a positive electrode and a negative electrode which are alternately laminated using a separator as a boundary, wherein at least one among the positive electrode and the negative electrode comprise the cross-linker according to embodiment of the present invention.

The separator is interposed between the positive electrode and the negative electrode to insulate between the electrodes. The separator may be used without special limit so long as it is conventionally used in the art. Specifically, it may include a polymer glass fiber based on an olefin such as polypropylene, etc. having chemical resistance and hydrophobicity, or a sheet, a nonwoven fabric, a kraft paper, etc. made of polyethylene or the like. More specifically, it may include high density polyethylene, low density polyethylene, linear low density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, and the like, and mixtures of two or more thereof may also be used.

Still another embodiment of the present invention provides a lithium secondary battery comprising said electrode assembly.

Specifically, the lithium secondary battery may be a lithium air battery, a lithium-sulfur battery, a lithium-selenium battery, a lithium-tellurium (Li—Te) battery, a lithium polonium (Li—Po) battery and the like. It includes said electrode assembly and an electrolyte impregnated in the electrode assembly. At this time, the electrolyte may be suitably selected depending on the type of lithium secondary battery.

The electrolyte may further comprise a non-aqueous organic solvent and a lithium salt.

Specifically, the non-aqueous organic solvent may be a polar solvent such as an aryl compound, a bi-cyclic ether, an acyclic carbonate, a sulfoxide compound, a lactone compound, a ketone compound, an ester compound, a sulfate compound, a sulfite compound and the like. More specifically, the non-aqueous organic solvent may include 1,2-dimethoxyethane, 1,2-diethoxyethane, 1,2-dibutoxy ethane, dioxolane (DOL), 1,4-dioxane, tetrahydrofuran, 2-methyl-tetrahydrofuran, dimethyl carbonate (DMC), diethyl carbonate (DEC), ethyl methyl carbonate (EMC), methyl propyl carbonate (MPC), ethyl propyl carbonate, dipropyl carbonate, butyl ethyl carbonate, ethyl propanoate (EP), toluene, xylene, dimethyl ether (DME), diethyl ether, triethylene glycol monomethyl ether (TEGME), diglyme, tetraglyme, hexamethyl phosphoric triamide, gamma butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester, propionic acid ester, dimethylformamide, sulfolane (SL), methyl sulfolane, dimethyl acetamide, dimethyl sulfoxide, dimethyl sulfate, ethylene glycol diacetate, dimethyl sulfite, ethylene glycol sulfite and the like. Among these, a solvent mixture of triethylene glycol monomethyl ether/dioxolane/dimethyl ether may be more preferable.

In addition, any compound capable of providing lithium ions used in a lithium secondary battery may be used as the lithium salt without special limit. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$ (Lithium bis(perfluoroethylsulfonyl)imide, BETI), $LiN(CF_3SO_2)_2$ (Lithium bis(Trifluoromethanesulfonyl)imide, LiTFSI), $LiN(C_aF_{2a+1}SO_2)(C_bF_{2b+1}SO_2)$ (provided that a and b are natural numbers, preferably 1≤a≤20 and 1≤b≤20), lithium poly[4,4'-(hexafluoroisopropylidene)diphenoxy]sulfonylimide (LiPHFIPSI), LiCl, LiI, $LiB(C_2O_4)_2$, and the like. Among these, sulfonyl group-containing imide lithium compounds such as LiTFSI, BETI, LiPHFIPSI, and the like may be more preferable.

In addition, the lithium salt may be preferably contained in the electrolyte in a concentration of 0.6 to 2 M. The electrolyte performance may be deteriorated due to the lowered conductivity of electrolyte when the concentration of lithium salt is less than 0.6 M, and the mobility of lithium ion may be reduced due to the increased viscosity of electrolyte when the concentration exceeds 2 M.

The electrolyte may further comprise additives ('other additives,' below), which may be generally used in the electrolyte for the purposes of enhancing the life characteristics of battery, suppressing the decrease of battery capacity, enhancing the discharge capacity of battery, etc., besides the aforementioned components of electrolyte.

As noted above, the lithium secondary battery according to the present invention shows such effects as improvements in charge delay and charge overvoltage phenomena, improvement in initial discharge capacity characteristics, and thus it is useful in those wherein a fast charge speed is required, for example, portable devices such as a mobile phone, a laptop computer, a digital camera, a camcorder, etc., electric vehicles such as hybrid electric vehicles (HEV), plug-in hybrid electric vehicles (plug-in HEV, PHEV), etc., and medium to large energy storage systems.

MODE FOR INVENTION

Hereinafter, the present invention will be described in detail by the following examples. However, the examples are merely to illustrate the present invention and not to limit the scope thereof.

Example 1: Preparation of a Positive Electrode

Example 1

To 1.2% by weight of aqueous CMC (4.17 g) was added Denka black, which was then mixed for 5 to 10 minutes in a PDM mixer with rotation of 1500 rpm and revolution of 1000 rpm. Zirconia ball (~12 g) was added thereto, S/Super-P (9/1 weight ratio) complex (1.5 g) was also added, and they are mixed under the same condition as above.

Thereafter, the compound of Formula 1 wherein all of $R_1$ to $R_3$ are ethoxy group, $R_5$ and $R_6$ are both hydrogen, and n is 3 and the compound of Formula 2 wherein $R_4$ is $R_8SH$ and $R_8$ is ethylene group were mixed and added (50% by weight in water, 0.10 g), and then mixed under the same condition as above.

Finally, a slurry was prepared in the weight ratio of the complex (S/Super-P=9:1 weight ratio): Denka Black: the binder (CMC/cross-linker=1:1 weight ratio)=75:20:5, which was then coated on a plate and dried to prepare a positive electrode.

Example 2

To 1.2% by weight of aqueous CMC (4.17 g) was added a mixture of the compound of Formula 1 wherein all of $R_1$ to $R_3$ are ethoxy group, $R_5$ and $R_6$ are both hydrogen, and n is 3 and the compound of Formula 2 wherein $R_4$ is $CO_2H$ and $R_8$ is methylene group (50% by weight in water, 0.10 g). Denka black was further added and mixed for 5 to 10 minutes in a PDM mixer with rotation of 1500 rpm and revolution of 1000 rpm. Zirconia ball (~12 g) was added thereto, S/Super-P (9/1 weight ratio) complex (1.5 g) was also added, and they are mixed under the same condition as above. Finally, a slurry was prepared in the weight ratio of the complex (S/Super-P=9:1 weight ratio): Denka Black: the binder (CMC/cross-linker=1:1 weight ratio)=75:20:5, which was then coated on a plate and dried to prepare a positive electrode.

Example 3

The same procedure as Example 1 was carried out to prepare a positive electrode except that the compound of Formula 3 wherein all of $R_1$ to $R_3$ are ethoxy group, $R_4$ is $R_8SH$, $R_5$ and $R_6$ are both hydrogen, $R_8$ is ethylene group, and n is 3 was used instead of the compounds represented by Formulae 1 and 2.

Comparative Example 1

The same procedure as Example 1 was carried out to prepare a positive electrode except that the compounds represented by Formula 1 and 2 were not used.

Comparative Example 2

The same procedure as Example 1 was carried out to prepare a c positive electrode except that only the compound of Formula 1 wherein all of $R_1$ to $R_3$ are ethoxy group, $R_5$ and $R_6$ are both hydrogen, and n is 3 was used and the compound represented by Formula 2 was not used.

Example 2: Preparation of a Lithium Sulfur Battery

Using the positive electrode prepared in the above examples and comparative examples, lithium sulfur batteries were manufactured.

At this time, a lithium metal having the thickness of 150 μm was used as a negative electrode.

A porous polyethylene separator was interposed between the positive electrode and the negative electrode as prepared above to give an electrode assembly. This electrode assembly was placed inside a case and then the electrolyte solution (TD2) was injected to the inside of the case to manufacture a lithium sulfur battery. At this time, the electrolyte solution was prepared by providing an electrolyte through the dissolution of lithium bis(trifluoromethanesulfonyl)imide (LiTFSI) of 1 M concentration in an organic solvent consisting of triethylene glycol monomethyl ether (TEGDME)/dioxolane (DOL)/dimethyl ether (DME) (mixing volume ratio=1/1/1), adding dilithium sulfide ($Li_2S$) and elemental sulfur to the electrolyte, and reacting them for 48 hours at 90° C. using a magnetic stirrer to synthesize lithium polysulfide in the electrolyte.

Experiment 1

The lithium sulfur batteries manufactured by the examples and comparative examples above were tested in the following manner to evaluate their cycle characteristics and coulombic efficiency (CE).

Specifically, the lithium sulfur batteries manufactured by the examples and comparative examples were tested for the cycle characteristics and coulombic efficiency, respectively, by performing 100 times of charge/discharge cycle under the conditions of 0.1 C/0.1 C at room temperature (25° C.) and the drive voltage range of 1.5 to 2.8 V. The results are shown respectively in FIGS. 2 and 3.

Figure 2:
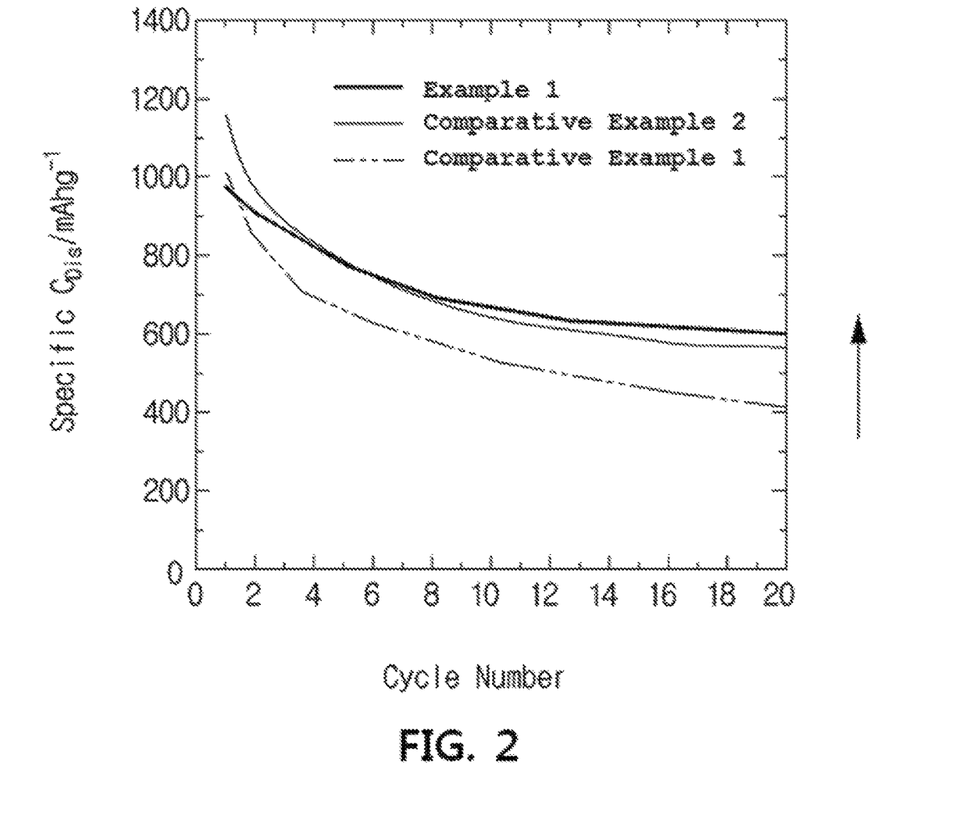
FIG. 2 is a graph illustrating the cycle characteristics of the lithium sulfur batteries prepared in Example 1, Comparative Example 1 and Comparative Example 2.
Figure 3:
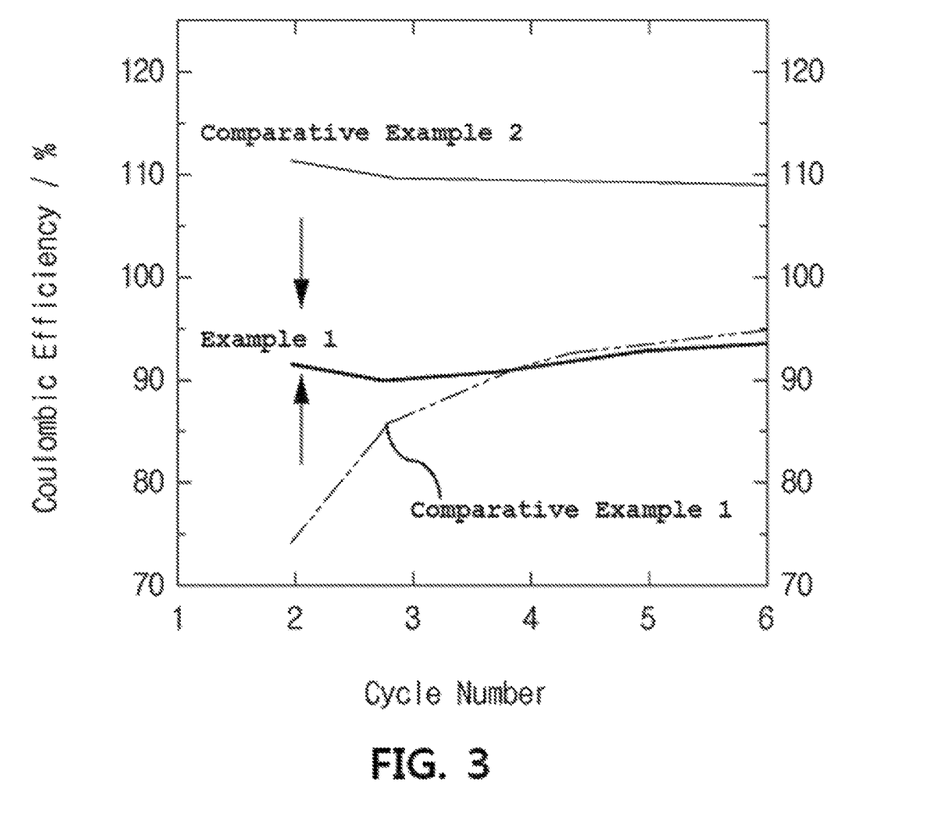
FIG. 3 is a graph illustrating the initial coulombic efficiency of the lithium sulfur batteries prepared in Example 1, Comparative Example 1 and Comparative Example 2.

FIG. 2 is a graph illustrating the cycle characteristics of the lithium sulfur batteries manufactured in Example 1, Comparative Example 1 and Comparative Example 2, and FIG. 3 is a graph illustrating the initial coulombic efficiency of the lithium sulfur batteries manufactured in Example 1, Comparative Example 1 and Comparative Example 3.

Referring to FIGS. 2 and 3, the battery of Example 1 wherein the cross-linker was added maintained 600 mAh even after 20 times of charge/discharge. This means that the battery of Example 1 retained a higher level of battery capacity than that of Comparative Example 1. It was also confirmed that the battery capacity of Example 1 was different from that of Comparative Example 2 after 6 cycles, and the difference was increased more and more (FIG. 2). In addition, the battery of Example 1 showed the highly enhanced initial coulombic efficiency compared with the battery of Comparative Example 1 and the improved cou- lombic efficiency compared with the batteries of Comparative Examples 1 and 2 (FIG. 3). Typically, the coulombic efficiency is recognized as being good when it is close to 100. The low coulombic efficiency of Comparative Example 1 means that overcharge occurs, and the coulombic efficiency over 100 of Comparative Example 2 suggests that a side reaction is taking place.

INDUSTRIAL APPLICABILITY

The present invention relates to an electrode for a lithium secondary battery, a method for preparing the same, an electrode assembly for a lithium secondary battery comprising the same, and a lithium secondary battery comprising the same. In the electrode for a lithium secondary battery, a cross-linker is combined with an aqueous binder to improve the physical properties of the aqueous binder, thereby enhancing the life span and the initial coulombic efficiency of the lithium secondary battery, preferably a lithium sulfur battery, and enhancing the area capacity of the electrode.

The invention claimed is:

1. An electrode for a lithium secondary battery, which comprises an electrode active material, an aqueous binder, a compound represented by the following Formula 1 and a compound represented by the following Formula 2:

[Formula 1]

[Formula 2]

wherein, in Formula 1 and 2, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of $N(R_7)_2$, $R_8SH$, $R_8Si(OR_7)_3$ and an alkyl group having 1 to 3 carbon atoms,

$R_5$ to $R_7$ are each independently hydrogen or an alkyl group having 1 to 3 carbon atoms, $R_8$ is an alkylene group having 1 to 3 carbon atoms, and n is an integer selected from 1 to 6.

2. The electrode for a lithium secondary battery of claim 1, wherein one compound selected from the group consisting of the compound represented by Formula 1, the compound represented by Formula 2 and combinations thereof is a cross-linker which crosslinks the aqueous binder.

3. The electrode for a lithium secondary battery of claim 1, wherein the compound represented by Formula 1 and the compound represented by Formula 2 are chemically combined to form a compound represented by the following Formula 3:

[Formula 3]

wherein, in Formula 3, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of $N(R_7)_2$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

4. The electrode for a lithium secondary battery of claim 1, wherein, in Formula 1 and 2, all of $R_1$ to $R_3$ are an alkoxy group having 1 to 3 carbon atoms and $R_4$ is one selected from the group consisting of $N(R_7)_2$, $R_8SH$ and $R_8Si(OR_7)_3$.

5. The electrode for a lithium secondary battery of claim 1, wherein the aqueous binder is one selected from the group consisting of carboxymethyl cellulose (CMC), alginate, carbonyl-β-cyclodextrine and nafion.

6. The electrode for a lithium secondary battery of claim 1, wherein the electrode for a lithium secondary battery comprises 0.1 to 40% by weight of the aqueous binder, 0.1 to 20% by weight of the compound represented by Formula 1 and the compound represented by Formula 2 and the remaining content of the electrode active material, based on a total weight of the electrode.

7. The electrode for a lithium secondary battery of claim 1, wherein the electrode for a lithium secondary battery is a positive electrode.

8. The electrode for a lithium secondary battery of claim 7, wherein the lithium secondary battery is a lithium sulfur battery, and the positive electrode active material is one selected from the group consisting of elemental sulfur ($S_8$), a sulfur-based compound and mixtures thereof.

9. The electrode for a lithium secondary battery of claim 1, wherein $R_4$ in Formula 2 is $R_8SH$.

10. The electrode for a lithium secondary battery of claim 3, wherein $R_4$ in Formula 3 is $R_8SH$.

11. A method for preparing an electrode for a lithium secondary battery, which comprises the steps of
    mixing an electrode active material, an aqueous binder, a compound represented by the following Formula 1 and a compound represented by the following Formula 2 to prepare a slurry for forming an electrode, and
    coating at least one side of a current collector by the slurry for forming an electrode to prepare the electrode:

[Formula 1]

-continued

[Formula 2]

wherein, in Formula 1 and 2, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of $N(R_7)_2$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

12. The method for preparing an electrode for a lithium secondary battery of claim 11, wherein the compound represented by Formula 1 and the compound represented by Formula 2 are chemically combined to form a compound represented by the following Formula 3:

[Formula 3]

wherein, in Formula 3, $R_1$ to $R_3$ are each independently one selected from the group consisting of an alkyl group having 1 to 3 carbon atoms, an alkoxy group having 1 to 3 carbon atoms and a halogen atom, $R_4$ is one selected from the group consisting of $N(R_7)_2$, $R_8SH$, $R_8Si(OR_7)_3$ and an alkyl group having 1 to 3 carbon atoms, $R_5$ to $R_7$ are each independently hydrogen or an alkyl group having 1 to 3 carbon atoms, $R_8$ is an alkylene group having 1 to 3 carbon atoms, and n is an integer selected from 1 to 6.

13. The method for preparing an electrode for a lithium secondary battery of claim 11, wherein the step of preparing the slurry for forming an electrode comprises: mixing the aqueous binder, the compound represented by Formula 1 and the compound represented by Formula 2 and then mixing with the electrode active material.

14. An electrode assembly for a lithium secondary battery, which has a positive electrode and a negative electrode which are alternately laminated using a separator as a boundary, and at least one among the positive electrode and the negative electrode are the electrode for a lithium secondary battery according to claim 1.

15. The method for preparing an electrode for a lithium secondary battery of claim 11, wherein $R_4$ in Formula 2 is $R_8SH$.

16. The method for preparing an electrode for a lithium secondary battery of claim 12, wherein $R_4$ in Formula 3 is $R_8SH$.

* * * * *